United States Patent [19]

Sloot

[11] Patent Number: 5,729,834
[45] Date of Patent: Mar. 24, 1998

[54] MANUFACTURE OF AN INFLATABLE APPLIQUE AND ITS METHOD OF MANUFACTURE

[76] Inventor: Alexander Sloot, R.R. Two-Box 882, Sugarloaf, Pa. 18249

[21] Appl. No.: 368,957

[22] Filed: Jan. 5, 1995

[51] Int. Cl.[6] .............................. A41B 1/00; A41B 1/08; A41D 27/00; A41D 27/08
[52] U.S. Cl. .............................. 2/243.1; 2/244; 2/115; 446/26; 446/28; 446/27; 156/276; 156/289
[58] Field of Search ........................ 2/69, 46, 49.1, 2/49.2, 49.3, 49.4, 49.5, 50, 51, 52, 75, 79, 85, 86, 87, 93, 94, 115, 105, 244, 243.1, 4; 446/26, 27, 28, 220, 226; 5/419, 449, 644, 932; 428/79; 156/276, 277, 289, 290

[56] References Cited

U.S. PATENT DOCUMENTS

| | | |
|---|---|---|
| 1,625,394 | 4/1927 | Roberts . |
| 1,668,782 | 5/1928 | Roberts . |
| 2,786,792 | 3/1957 | Mikiska . |
| 3,070,479 | 12/1962 | Meyer . |
| 3,149,017 | 9/1964 | Ehrreich . |
| 3,272,645 | 9/1966 | Duhoo et al. ............... 156/289 |
| 3,303,081 | 2/1967 | Michaelson et al. ............ 156/289 |
| 3,335,045 | 8/1967 | Post . |
| 3,508,754 | 4/1970 | Shorin ...................... 156/289 X |
| 3,830,676 | 8/1974 | Elkins . |
| 3,920,500 | 11/1975 | Brieske . |
| 3,926,705 | 12/1975 | Todd . |
| 4,803,029 | 2/1989 | Iversen . |
| 4,917,646 | 4/1990 | Kieves . |
| 5,079,778 | 1/1992 | Sloot ........................ 2/115 X |
| 5,251,337 | 10/1993 | Sloot ........................ 2/115 X |
| 5,484,502 | 1/1996 | Bozanic ..................... 156/289 |

Primary Examiner—Jeanette E. Chapman

[57] ABSTRACT

An inflatable applique for a fabric article which may be attached to an article of clothing after it is fully manufactured comprising a top and a backing layer of vinyl which are sealing affixed to one another creating a substantially airtight enclosure, a heat-fusible layer disposed on the outside of the backing layer, and an anti-sealing treatment disposed between some or all portions the top and backing layers to prevent fusing of those portions during attachment of the applique to an article of clothing. In the method of manufacture, the top and backing layers are welded together before attachment of the enclosure to a clothing article.

18 Claims, 8 Drawing Sheets

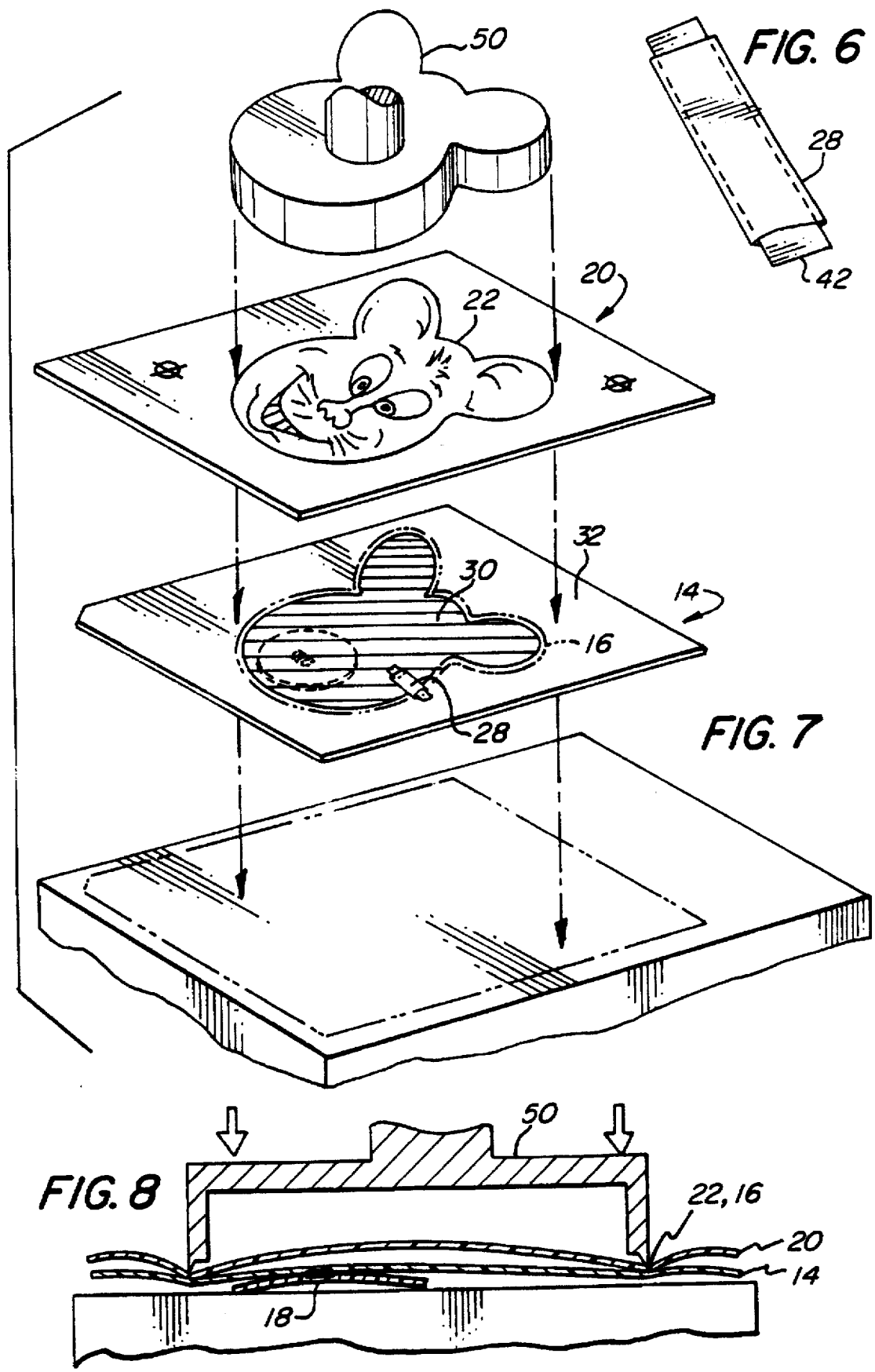

MANUFACTURE OF AN INFLATABLE APPLIQUE AND ITS METHOD OF MANUFACTURE

FIELD OF THE INVENTION

The present invention relates to appliques made of vinyl and other plastics, and specifically to inflatable appliques that may be applied to articles of clothing after the inflatable appliques have been manufactured.

BACKGROUND OF THE INVENTION

Non-inflatable vinyl appliques are known and have been made by a variety of methods. For example, a single sheet of vinyl may be imprinted, cut to a desired shape with a die, and attached to a fabric by heat welding, sewing, or gluing. In more sophisticated methods, a vinyl sheet is imprinted and then welded to the fabric by radio frequency welding, ultrasonic welding, or vibration.

Various inflatable devices are also known, including inflatable vinyl appliques. These inflatable vinyl appliques necessarily include multiple layers of material which need to remain independent of one another for proper inflation.

The above-mentioned welding methods of manufacturing are with specially-shaped dies to attach inflatable vinyl appliques to apparel. This involves special attachment the applique to the article of clothing prior to its final step of manufacture. The specially-contoured die is needed because, otherwise, the welding processes would cause the multiple vinyl layers to fuse together as well as to the article of clothing, and prevent proper inflation.

Current methods assemble the inflatable vinyl applique during the step of its welding to the article of clothing. An example of this process is U.S. Pat. No. 5,251,337, the disclosure of which is hereby incorporated by reference in its entirety. This requires that the garment be brought to the place where the vinyl applique is made or the use of expensive equipment and dies at the clothing manufacture to enable attachment of the inflatable applique.

SUMMARY OF THE INVENTION

It is an object of the invention to provide a completed inflatable vinyl applique that may be affixed with the use of heat to an article of clothing. It is a further object of the present invention to provide a method of manufacturing such an inflatable vinyl applique and to apply it to an article of clothing after being fully manufactured.

In accordance with one embodiment of the invention, an inflatable applique for an article of clothing comprises an air impervious backing layer of flexible vinyl material having a desired decorative peripheral outline, and an air impervious top layer of flexible vinyl material having a peripheral outline that is complementary to the peripheral outline of the backing layer. Also, an anti-sealing layer is disposed between the top and backing layers. The top layer is sealed to the backing layer along its outer peripheral zone, so that the top layer and backing layer form a substantially airtight, inflatable enclosure. A heat-fusible layer is placed on the outside surface of the backing layer for attachment of the applique to an apparel such as a hat or T-shirt or the like.

The anti-sealing layer disposed between the top and backing layers prevents the layers from welding to one another when heat is applied to the heat-fusible layer through both the top layer and the backing layer.

In one embodiment, a non-transferable ink, such as ultra violet-curable ink, is imprinted on one or both of the inside surfaces of the top and backing layers to create the anti-sealing layer. The layer of non-transferable ink prevents the two layers from fusing together when a heat source is applied to the top layer to fuse the heat-fusible layer on the outside of the backing layer to an article of clothing.

In another embodiment, the anti-sealing layer is created by inserting a piece of heat-tolerant release paper between the top layer and the backing layer during manufacturing. Similar to the non-transferable ink, the release paper prevents the layers from fusing to one another and ensures that the vinyl applique will inflate properly.

In another embodiment, the anti-sealing layer is created by disposing powder between the top and backing layers. Similarly to the other anti-sealing methods, the powder prevents the top and backing from fusing to one another at the temperature levels attained in fusing the heat-fusible layer on the outside of the backing layer to a material article.

In one embodiment of the present invention, the anti-sealing layer is intentionally not disposed between certain portions of the top and backing layers. This created voids in the anti-sealing treatment layer thereby allowing the top and backing layers to fuse to one another at those certain areas to provide shapes and designs to the inflated applique.

The heat-fusible layer disposed on the outside surface of the backing layer may be of any shape and size. In one embodiment, the surface area of the heat-fusible layer is less than the surface of the backing layer to allow portions of the inflated applique to pull away from the material article as it is inflated. Also, since only the area across from the heat-fusible layer needs be heated, the anti-sealing layer discussed above may be limited to the corresponding size and location of the heat-fusible layer.

Valve means are attached to the enclosure so that it can be inflated to create a three-dimensional object. The valve means may be affixed to either the top or backing layers of the enclosure.

A method of manufacturing such an inflatable applique for an article of clothing comprises the steps of providing a top layer and a backing layer, providing an anti-sealing treatment between the top and backing layers, sealingly affixing the top layer to the backing layer around the periphery (at least), cutting away and separating the excess material, and providing a heat-fusible adhesive layer on the outside of the backing layer.

The step of providing an anti-sealing treatment between the top and backing layers may comprise imprinting the inside surface of either the top layer or the backing layer, or both, with non-transferable ink, including without limitation ultra-violet-curable ink. The step of providing an anti-sealing treatment may also comprise providing a piece of heat-tolerant release paper between one or more portions of the top and backing layers. Further, this step may also comprise providing a powder, including without limitation, talcum power or silicone powder, between the top and backing layers.

The step of affixing the top layer to the backing layer may comprises a welding step using an RF-welding die, and the step of cutting the top and backing layers may occur at substantially the same time as the welding step.

Another embodiment of the method of manufacturing also includes heating the heat-fusible layer to sealingly affixing the backing layer to a fabric article.

Other objects, aspects, and features of the present invention in addition to those mentioned above will be pointed out in detail or will be understood from the following detailed description provided in conjunction with the accompanying drawings.

DETAILED DESCRIPTION OF THE DRAWINGS

FIG. 6 is a perspective view of a valve assembly.

FIG. 7 is an exploded view showing a step of affixing top and backing layers to form an enclosure and the elements of the article of the invention.

FIG. 8 is a side, cross-sectional view of the step of affixing a top and backing layers and the elements of the article of the invention.

DETAILED DESCRIPTION OF THE INVENTION

Figure 1:
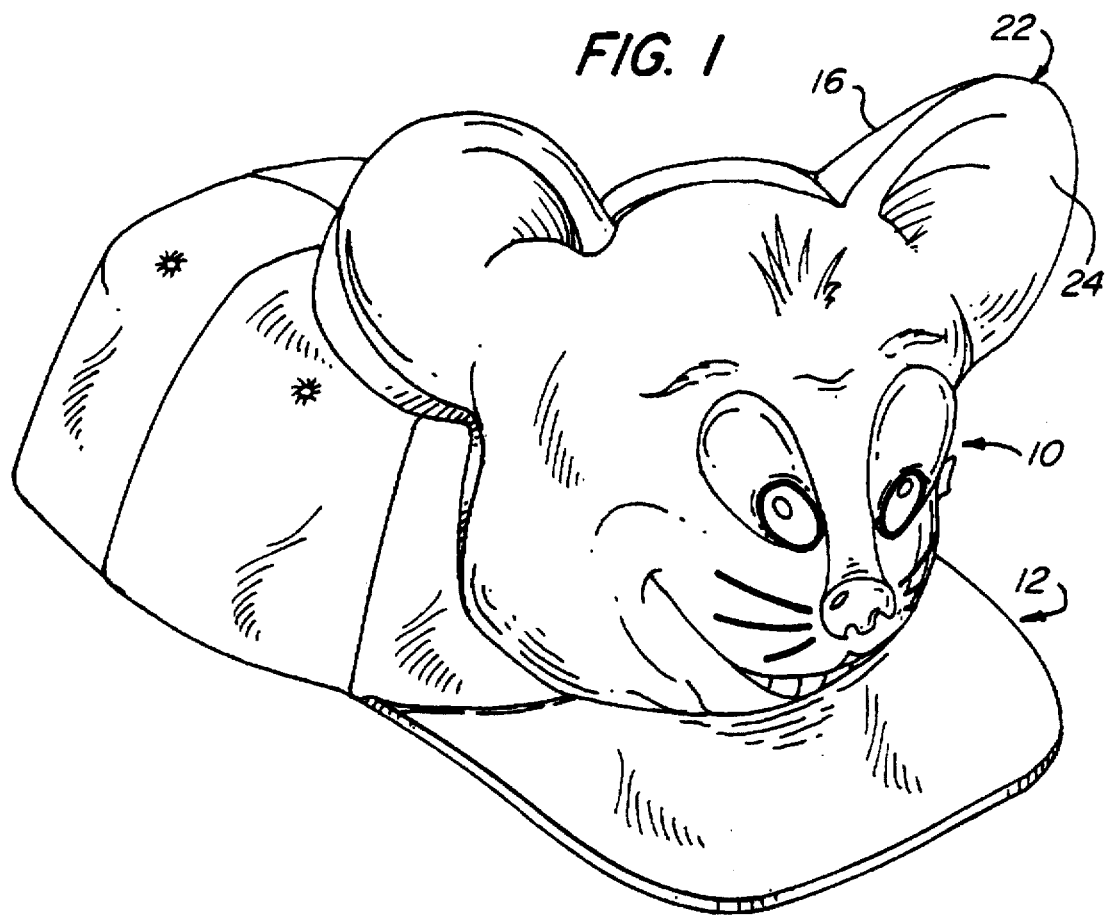
FIG. 1 is a perspective view of an inflatable applique for an article of clothing in accordance with the invention.

"Clothing", as used herein, includes shirts, T-shirts, sweatshirts, sweatpants, hats, jackets, coats, pants, shorts, and any other article adapted to be worn.

"Polymeric" materials, as used herein, includes vinyl materials such as vinyl sheeting, expanded vinyl, supported vinyl, neoprene compounds, polypropylene, polyethylene, polyesters, nylons, polyamides, rubber and rubber compounds, and all other synthetic materials useful in the products and processes described in this application. However, in most situations, vinyl sheet products will be preferred, as they are simpler to use and process, and are available in a wide variety of useful embodiments, including opaque, transparent, clear, frosted, and reflective. Vinyl is also preferred for its ability to receive a wide variety of decorative designs through painting, printing or embossing.

In the drawings, like numbered elements are to be considered to be the same elements as shown and described in reference to other drawings.

Figure 2:
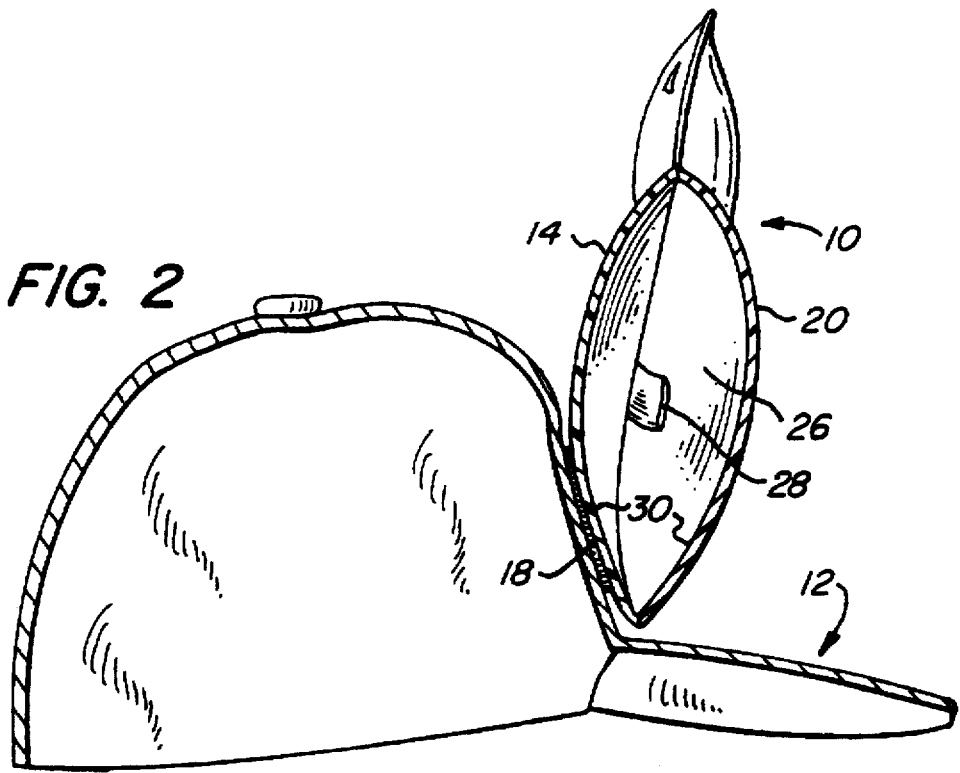
FIG. 2 is a side, cross-sectional view of an inflatable applique for an article of clothing in accordance with the invention.

Referring now to FIGS. 1–2, an inflatable applique 10 for an article of clothing 12 such as a hat is shown. Applique 10 includes an air-impervious backing layer 14 of polymeric vinyl material having a desired decorative peripheral outline 16. An air-impervious top layer 20 of flexible polymeric vinyl material having a peripheral outline 22 that is complementary to the peripheral outline 16 of the backing layer. The top layer 20 is sealed to the backing layer 14 along the outer peripheral zone 24 of the top layer 20. Zone 24 is located inwardly from and adjacent to the peripheral outline 22. The top layer 20 and the backing layer 14 form a substantially airtight inflatable enclosure 26. A valve 28 is attached to the enclosure 26 so that it can be inflated to create a three-dimensional object.

A heat-fusible layer 18 is disposed on the outside surface 19 of the backing layer 14 for attachment of the applique 10 to a material article, such as an article of clothing 12 with the application of heat applied either from inside the hat or from the outside through layers 20 and 14.

An anti-sealing treatment layer 30 is disposed between the backing layer 14 and the top layer 20 to prevent the top layer 20 from fusing to the backing layer 14 during heat attachment of the applique to an article of clothing.

Figure 3:
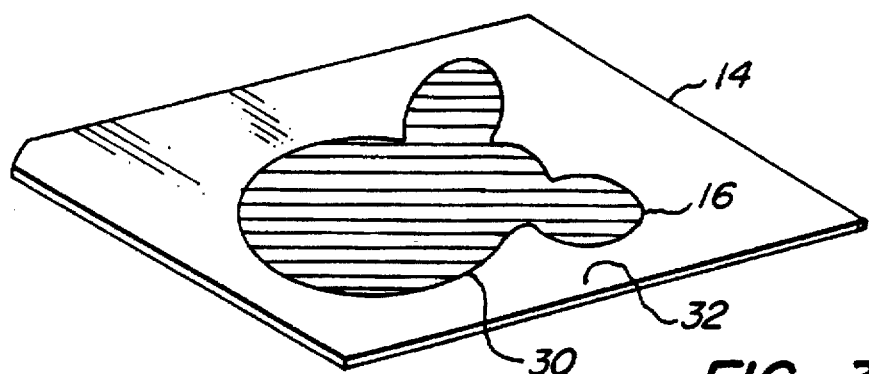
FIG. 3 is a perspective view of an uncut backing layer with a design outline.
Figure 4:
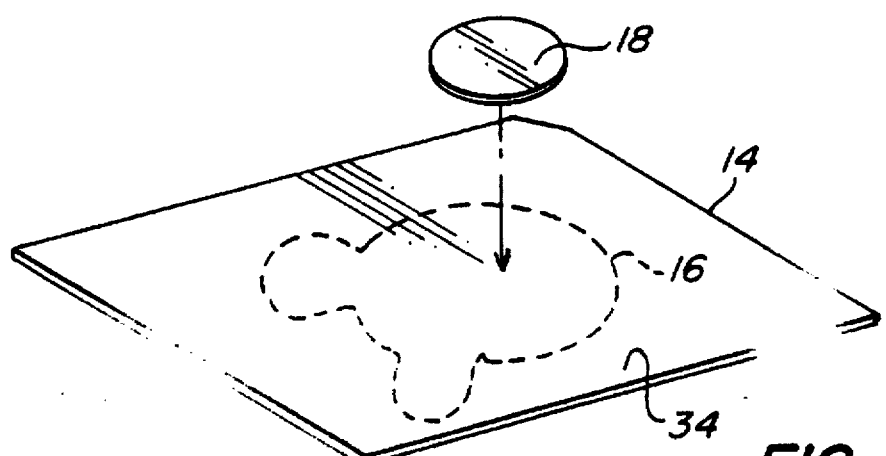
FIG. 4 is an exploded view of a heat-fusible layer and an outside surface of a backing layer.
Figure 5:
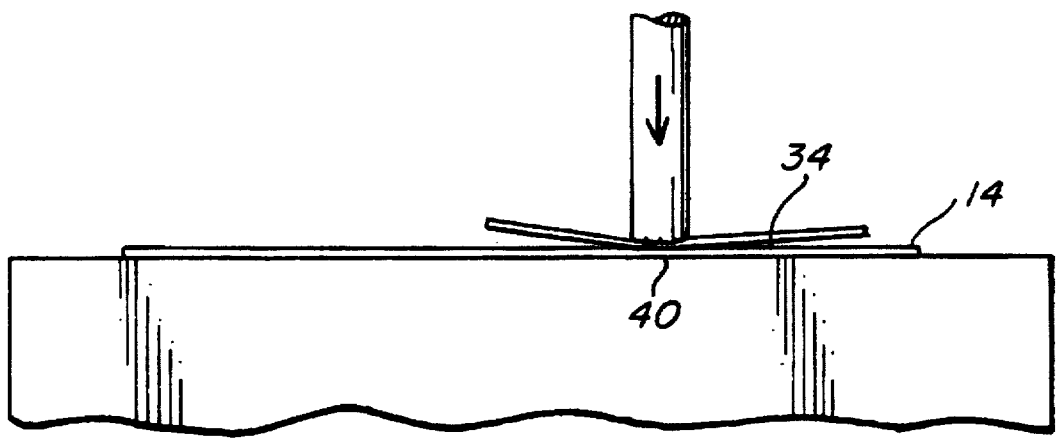
FIG. 5 is a side view of a step of affixing the heat-fusible layer on the outside surface of a backing layer.

Referring now to FIGS. 3–5, an anti-sealing treatment layer 30 is disposed on the inside surface 32 of the backing layer 14. Heat-fusible layer 18 is located on the outside surface 34 of the backing layer 14. The backing layer 14 and the heat-fusible layer 18 are formed by locating the heat-fusible layer 18 within the area of the decorative peripheral outline 16 on the backing layer 14. The heat-fusible layer 18 may be attached preliminarily, to the outside surface 19 of the backing layer 14, in one or more spots by a preliminary weld shown being formed at 40 or an adhesive at 40 in FIG. 5.

Referring to FIGS. 6–7, a valve 28 which is comprised of a hollow tube of polymeric material is located between the inside surface 32 of the backing layer 14 and inside surface 36 the top layer 20 (hidden). During manufacturing and during attachment to an article of clothing 12, an anti-sealing element such as a piece of release paper, may be inserted into the valve 28 to prevent fusing thereof during assembly.

Referring to FIG. 7 and 8, in the preferred embodiment, the steps of welding the top layer 20 to the backing layer 14 with the valve 28 between them, and the step of cutting the peripheral outlines 22 and 16 of the top and backing layers 20 and 14 preferably occur substantially simultaneously. This is achieved by a peripheral sealing and cutting die 50 which is provided with the sealing and cutting edge 52. It is also possible, however to perform separate steps for welding and cutting in other embodiments.

Figure 9:
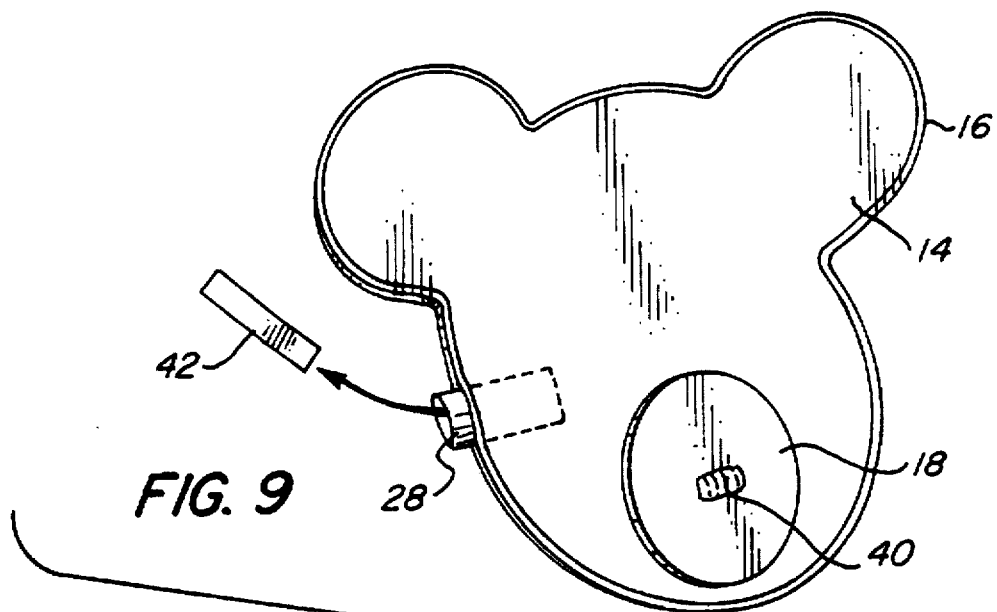
FIG. 9 is a perspective view of a completely manufactured inflatable applique in accordance with this invention prior to being attached to an article of clothing.

Referring to FIG. 9, the completed inflatable applique is shown. At this point the backing layer 14 and the top layer 20 (hidden) are sealed together around the peripheral outline 16. The anti-sealing element 42 may be removed from the valve 28 to permit inflation for testing or other purposes. The heat-fusible layer 18 is attached to the backing layer 14 by one or more preliminary welds 40. The anti-sealing treatment layer 30 (also hidden) is between the backing layer 14 and the top layer 20.

At this point the applique 10 is complete and can be sold and shipped to a clothing manufacturer who can affix the vinyl applique to a suitable article of clothing such as a hat. Attachment of the applique can be conveniently carried out with a general application of heat to either the front and/or back of the article.

Figure 10:
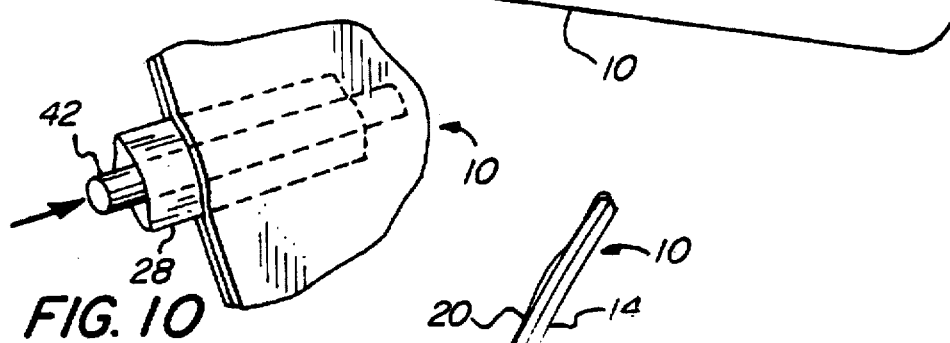
FIG. 10 is a perspective view of a valve assembly.
Figure 11:
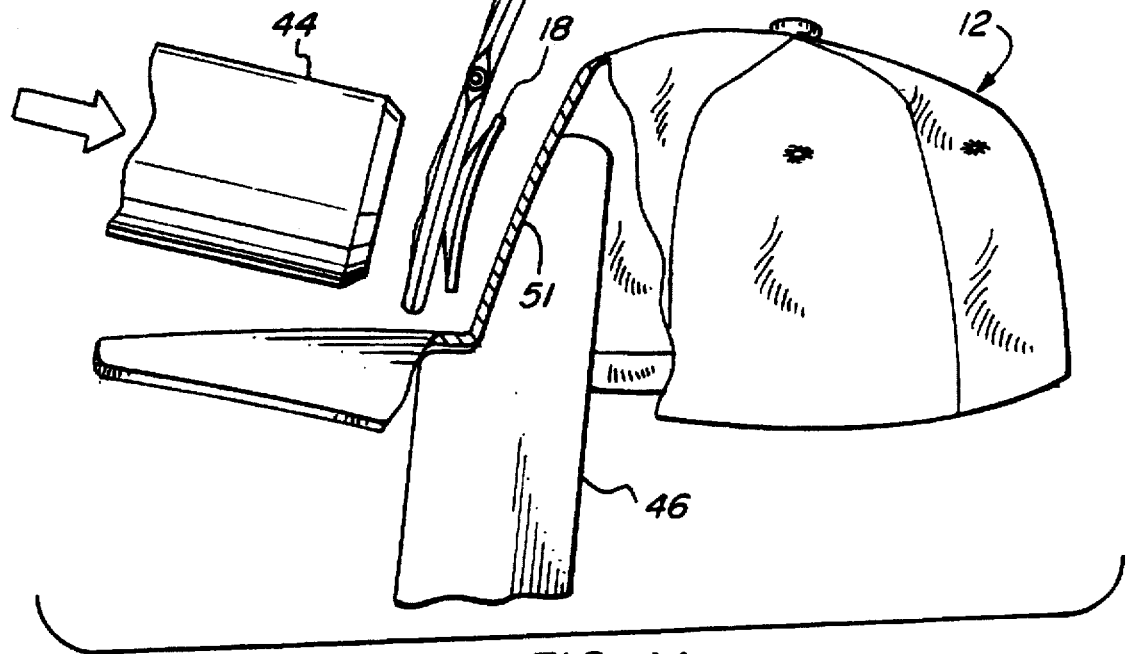
FIG. 11 is a side, cross-sectional view of a step of heating the heat-fusible layer and sealing affixing the applique to an article of clothing.

Referring to FIGS. 10–11 the additional steps of affixing the inflatable applique to an article of clothing, here a hat, are shown. The applique 10 is placed between front wall 51 of the hat 12 and two welding elements 44, 46 and pressure is applied between the elements. The heat generated by the welding elements 44, 46 fuses the heat-fusible layer 18 to the backing layer 14 and wall 51 of hat 12, thus bonding the entire applique 10 to the hat wall 51. The top layer 20 and the backing layer 14, however, do not themselves fuse together because of the anti-sealing treatment layer 30 (not shown in FIGS. 10–11) between them.

Figure 12:
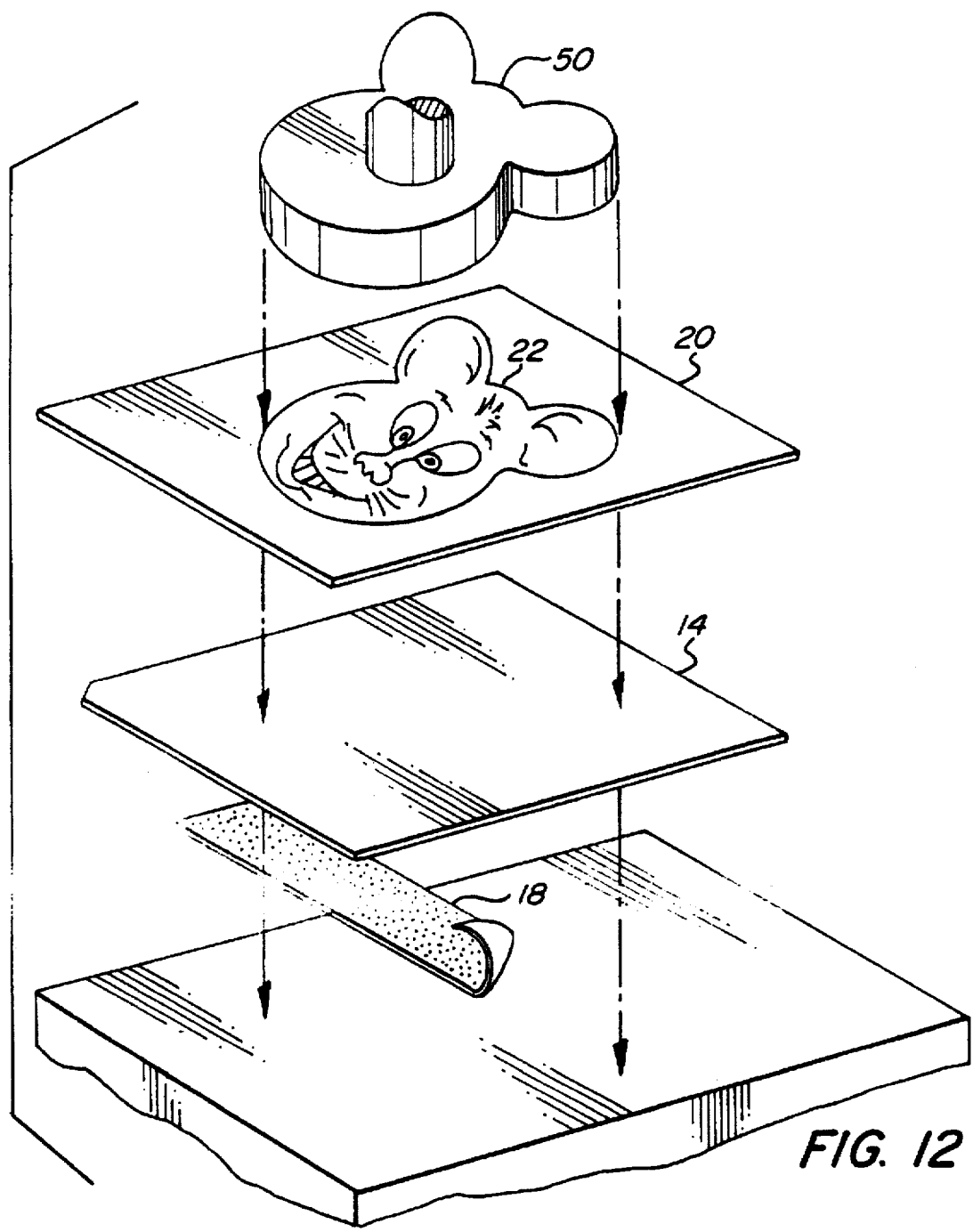
FIG. 12 is an exploded view showing a step of simultaneously affixing top and backing layers to form an enclosure and a heat-fusible layer for attachment.
Figure 13:
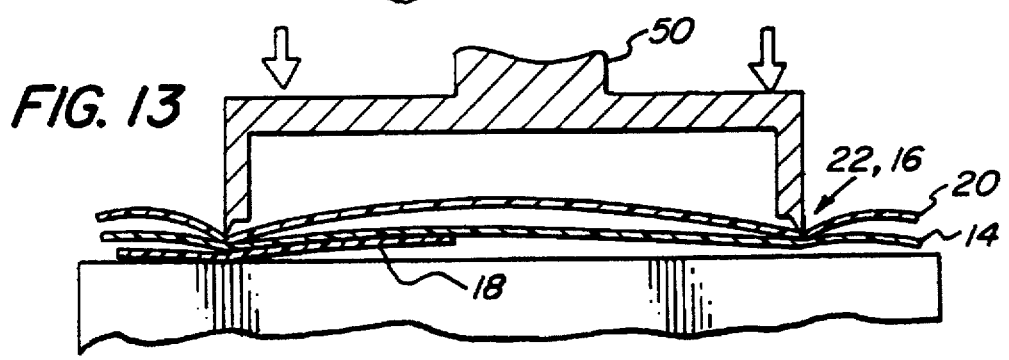
FIG. 13 is a side, cross-sectional view of the step of affixing a top and backing layers to form an enclosure a heat-fusible layer for attachment, as shown in FIG. 12.

Referring to FIGS. 12 and 13, in another embodiment of the invention, a heat-fusible layer 18 is bonded to the outside surface 34 of the backing layer backing layer 14. This may be accomplished substantially simultaneously with the steps of fusing and cutting the top and backing layers 20, 14. An anti-sealing treatment layer 30 (not shown) is also disposed between the top and backing layers 20, 14.

Figure 14:
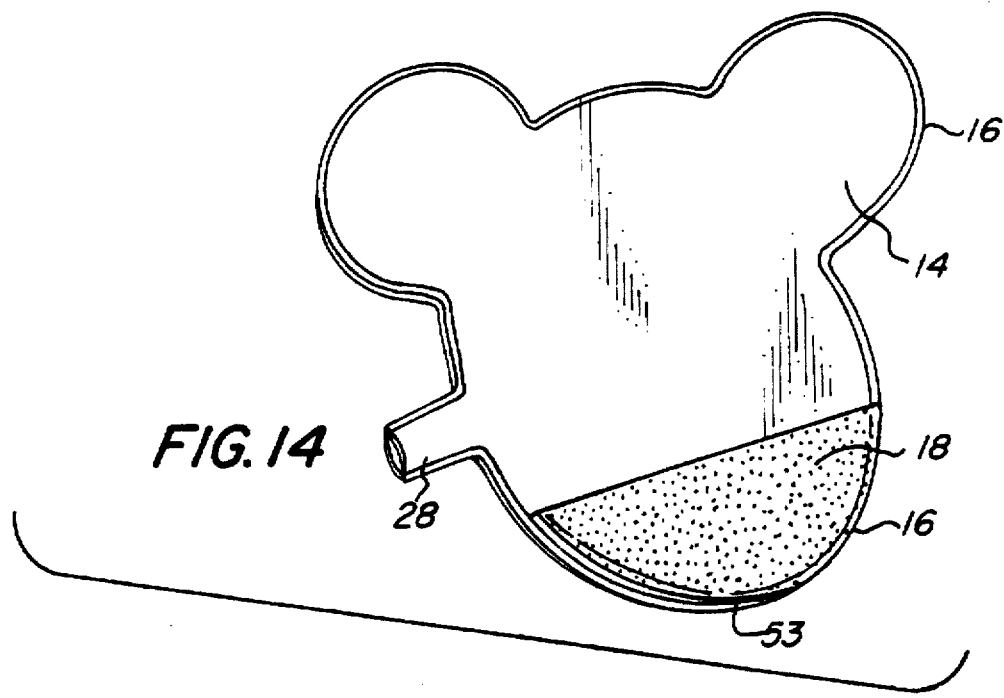
FIG. 14 is a perspective view of a completely manufactured inflatable applique in accordance with this invention prior to being attached to an article of clothing.
Figure 15:
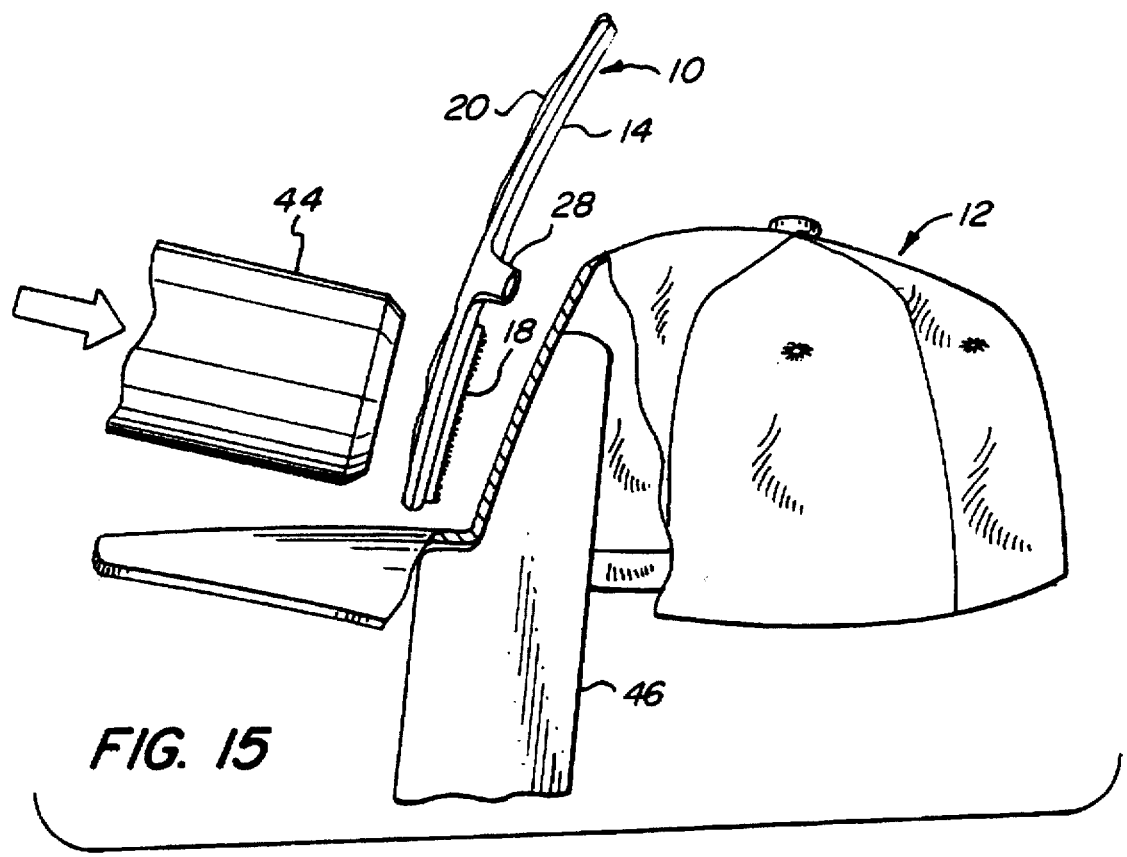
FIG. 15 is a side, cross-sectional view of a step of heating the heat-fusible layer and sealing affixing the applique to an article of clothing.

Referring to FIGS. 14 and 15, a completed inflatable applique 10 with a heat fusible layer 18 whose peripheral edge 53 which follows the peripheral outline 16 of the backing layer 14 is shown. In FIG. 14, the heat-fusible layer 18 may cover only a portion of the outside surface 34 of the backing layer 14, however, in other embodiments, the heat-fusible layer 18 may cover substantially all of said surface.

Figures 16, 17:
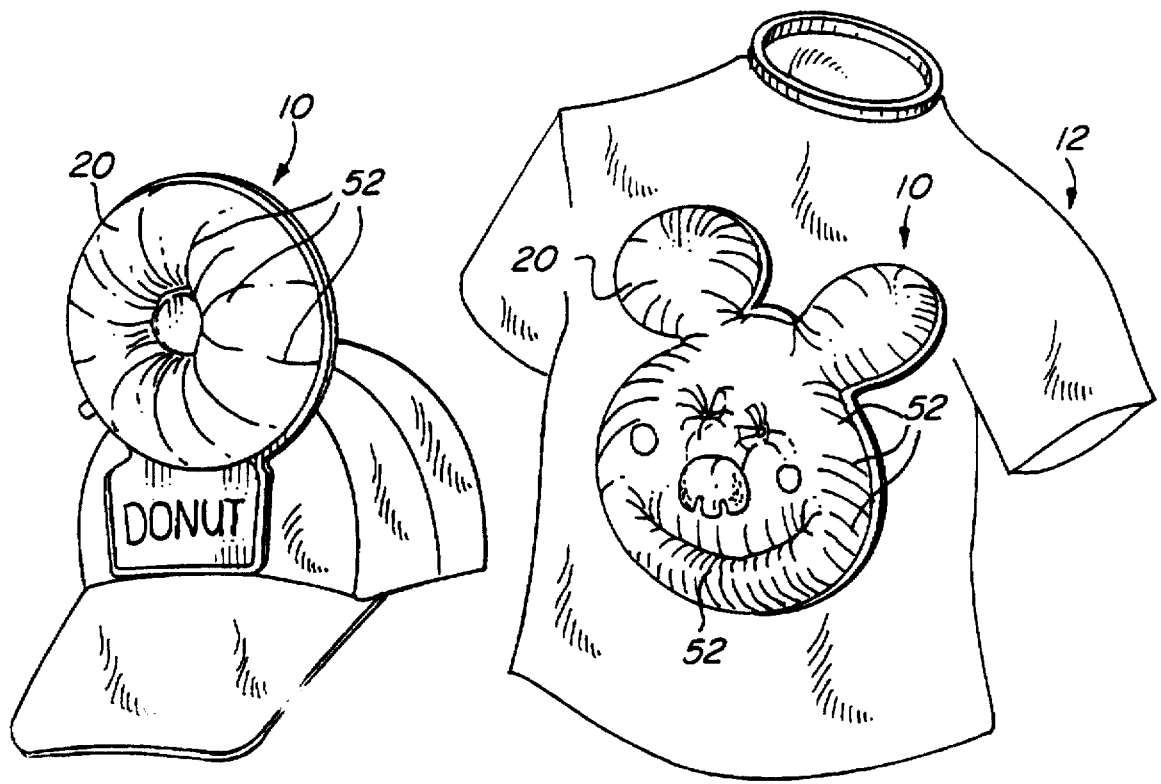
FIG. 16 is a perspective view of an inflatable applique having portions of the top and backing layers fused to one another at certain portions thereby providing shapes and designs to the inflated applique.
FIG. 17 is a perspective view of an inflatable applique having portions of the top and backing layers fused to one another at certain portions thereby providing shapes and designs to the inflated applique.

Referring to FIGS. 16 & 17, in one embodiment of the invention, the applique 10 includes inner seals 52 between the top layer 20 and the backing layer 14 (hidden). These inner seals 52 give shape and design to the internal portion of the applique 10.

Figure 18:
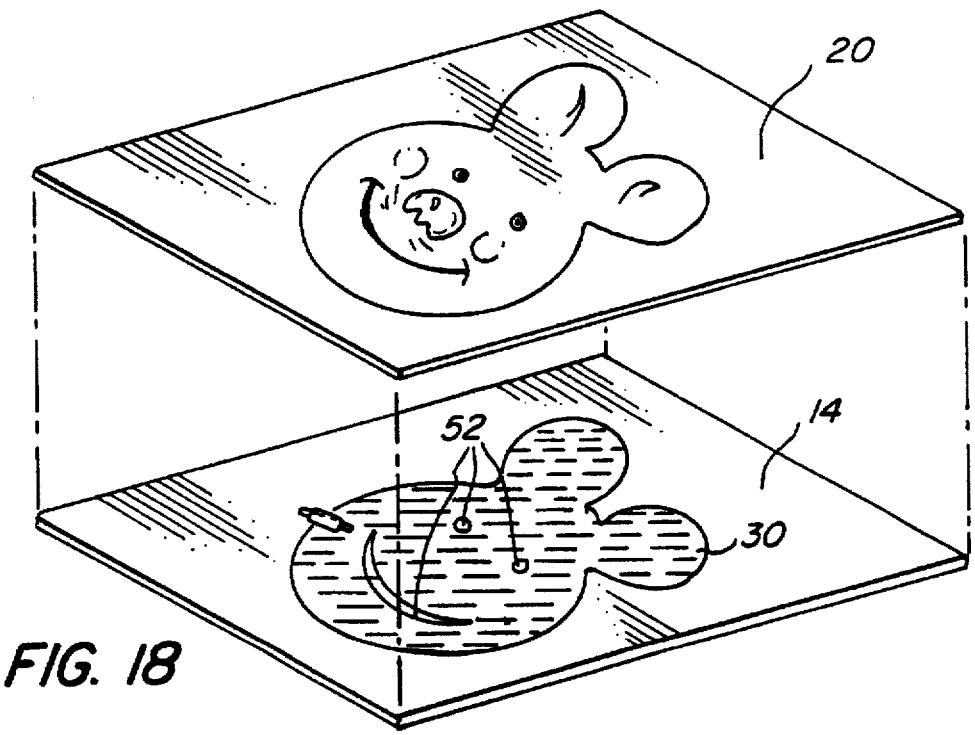
FIG. 18 is an exploded view of a top layer and a backing layer with voids in the anti-sealing treatment layer.

Referring to FIG. 18, voids 56 in the anti-sealing treatment layer 30 are intentionally created between the top layer 20 and the backing layer 14 to give three-dimensional shape and design to the applique when it is inflated.

Figure 19:
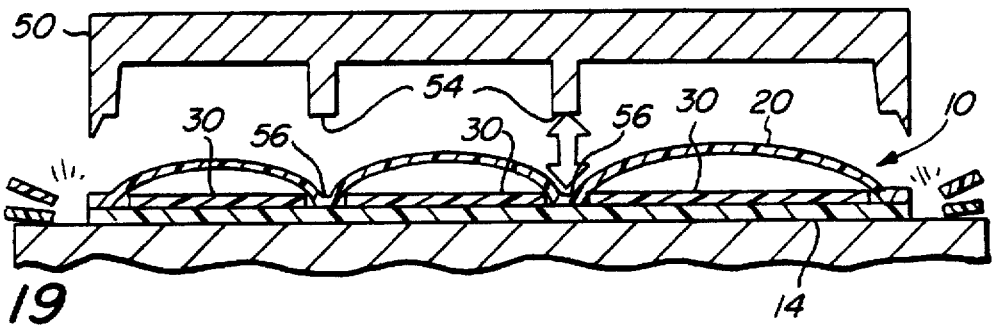
FIG. 19 is a side, cross-sectional view of the step of sealing a top layer to a backing layer, along their peripheries and certain interior portions, using a die with inner sealing areas aligned with voids in the anti-sealing treatment layer, and the step of cutting the top and backing layers.

Referring to FIG. 19, inner sealing areas 54 in the die 50 are aligned with voids 56 in the anti-sealing treatment layer 30 to allow the top layer 20 to fuse to the backing layer 14 when the applique 10 is manufactured.

Figure 20:
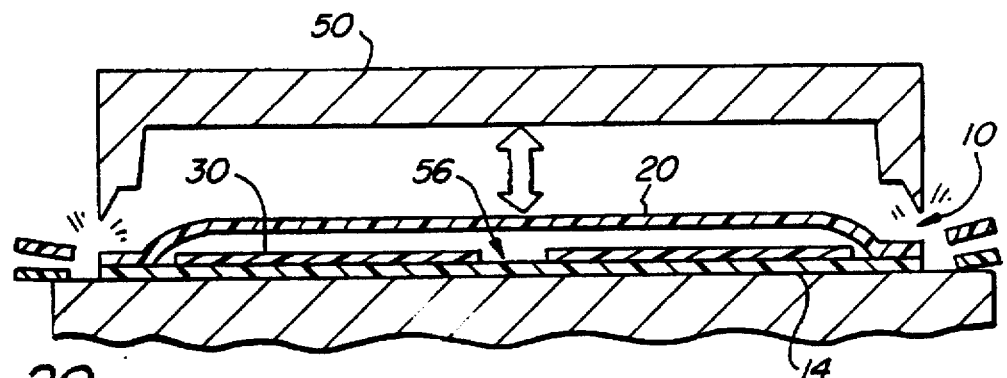
FIG. 20 is a side, cross-sectional view of the step of sealing a top layer to a backing layer along only their peripheries, and the step of cutting the top and backing layers.

Referring to FIG. 20, the anti-sealing treatment layer 30 includes voids 56 to allow the top layer 20 to fuse to the backing layer 14, however, in this embodiment, these areas are not fused together during manufacturing. The certain interior portions are intended to be fused together when the applique 10 is affixed to an article of clothing as shown in FIG. 21.

Figure 21:
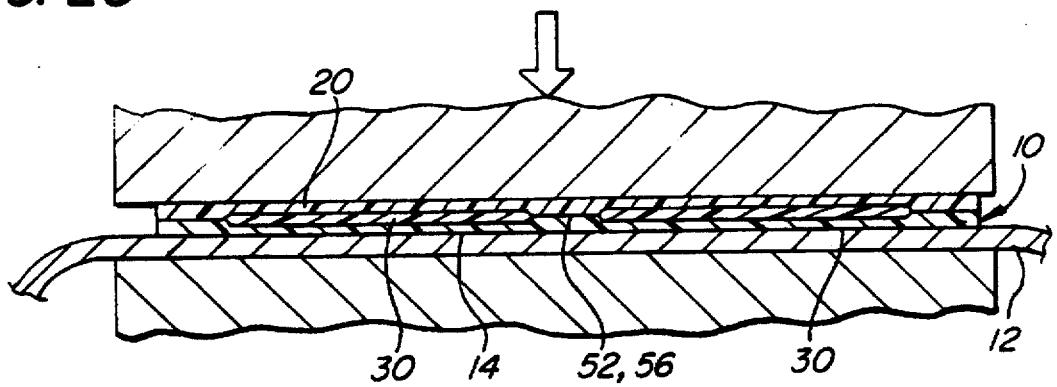
FIG. 21 is a side, cross-sectional view of the step of simultaneously affixing an applique to a clothing article and fusing the top and backing layers in an area where a void in the anti-sealing treatment layer exists.

Referring to FIG. 21, in one embodiment of the invention, simultaneously with the step of affixing the applique 10 to an article of clothing 12, inner seals 52 between the top layer 20 and the backing layer 14 are created when the top layer 20 and the backing layer 14 are fused together at certain interior portions where a void 56 in the anti-sealing treatment layer 30 exists.

Figure 22:
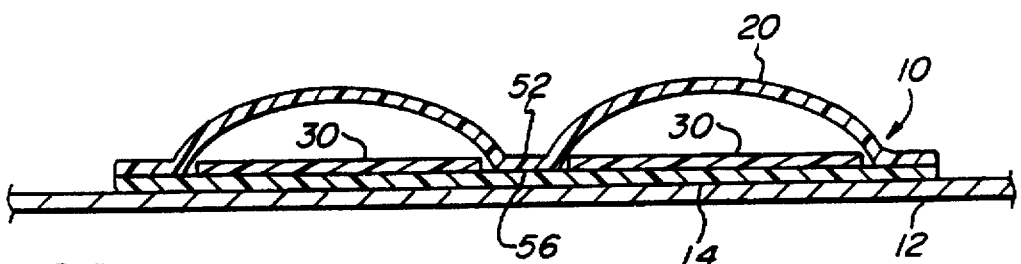
FIG. 22 is a side, cross-sectional view of an inflated applique affixed to an article of clothing. The top and backing layers of the applique are fused along their periphery and at a certain portion where a void in the anti-sealing treatment layer exists.

Referring to FIG. 22, an applique 10 with inner seals 52 between the top layer 20 and the backing layer 20 created at voids 52 in the anti-sealing treatment layer 30 creating shapes and designs to the inflated applique 10.

The foregoing embodiments are only intended to be illustrative of the invention, as the inflatable applique may take a number of shapes and sizes and as the anti-sealing treatment layer may be comprised of a number of materials.

The present invention provides a new product and method of manufacturing. The examples given herein are not limiting of the invention, as it will have many applications and adaptations, all intended to be within the scope of the claims as follows.

I claim:

1. A method of manufacturing an inflatable applique for a fabric article comprising the steps of:
   (a) providing a top layer and a backing layer, said top and backing layers having inside and outside surfaces;
   (b) providing an anti-sealing treatment between said inside surfaces of said top and backing layers;
   c) sealingly affixing said top layer to said backing layer at least around a peripheral zone of said top layer to form a substantially airtight inflatable enclosure that defines a three dimensional object;
   (d) cutting said top and backing layers to provide said top and backing layers with complementary peripheral outlines;
   (e) separating excess top and backing layers from around the perimeter of said enclosure; and
   (f) providing a heat-fusible adhesive on said outside surface of said backing layer.

2. The method as in claim 1 wherein said step of providing an anti-sealing treatment further comprises leaving voids in said anti-sealing treatment layer.

3. The method as in claim 2 wherein said step of sealingly affixing said top layer to said backing layer further comprises sealing affixing said top layer to said backing layer at certain portions where said voids in said anti-sealing treatment exist.

4. The method as in claim 3 wherein said step of sealing affixing said top layer to said backing layer further comprises using a die with inner sealing areas aligned with said voids in said anti-sealing treatment.

5. The method as in claim 1 further comprising locating said heat-fusible adhesive on said outside surface of said backing layer opposite said anti-sealing treatment.

6. The method as in claim 1 wherein said step of providing an anti-sealing treatment comprises depositing a non-transferable ink on at least one of said inside surfaces of said top and backing layers.

7. The method as in claim 6 wherein said non-transferable ink is an ultra violet-curable ink.

8. The method as in claim 1 wherein said step of providing an anti-sealing treatment comprises providing heat-tolerant release paper between said inside surfaces of said top and backing layers.

9. The method as in claim 1 wherein said step of providing an anti-sealing treatment comprises providing powder between said inside surfaces of said top and backing layers.

10. The method as in claim 9 wherein said powder is talcum powder.

11. The method as in claim 9 wherein said powder is silicone powder.

12. The method as in claim 1 further comprising the steps of:
   (a) heating said outside surface of said top layer; and
   (b) sealingly affixing said outside surface of said backing layer to a fabric article.

13. The method as in claim 12 further comprising the step of sealing affixing said top layer to said backing layer at certain portions where a void in said anti-sealing treatment exists.

14. The method as in claim 12 wherein said fabric article comprises a hat.

15. A method for making an inflatable applique for an article of apparel comprising:
   (a) forming a top vinyl layer and a backing vinyl layer which are heat sealable to each other with a heat sealing die; said top and backing layers having inside and outside surfaces;
   (b) affixing said top and backing layers to one another at least around a peripheral zone of said top layer with a heat sealing die applied to one of said outside surfaces so as to form an inflatable applique;
   (c) placing a thin anti-sealing layer formed of a non-transferable ultraviolet cured ink so as to be selectively affixed to one of said inside surfaces of said top and backing layers; and
   (d) selectively disposing a heat-fusible adhesive on said outside surface of said backing layer opposite said anti-sealing layer; applying heat through said top layer to affix the top and bottom layers and form said article of apparel without causing an attachment between the top and backing vinyl layers at areas where said ink is affixed.

16. The method for making the article as in claim 15 wherein said step of placing said anti-sealing layer further comprises the step of forming voids in said anti-sealing layer so as to enable a heat sealing attachment of inside surfaces of said backing and top layers during their affixation.

17. The method of forming the article as in claim 15 and further comprising the step of connecting a fabric article to said backing layer with said heat-fusible adhesive.

18. An article in the shape of a hat and formed in accordance with the method as in claim 17.

* * * * *